UNITED STATES PATENT OFFICE.

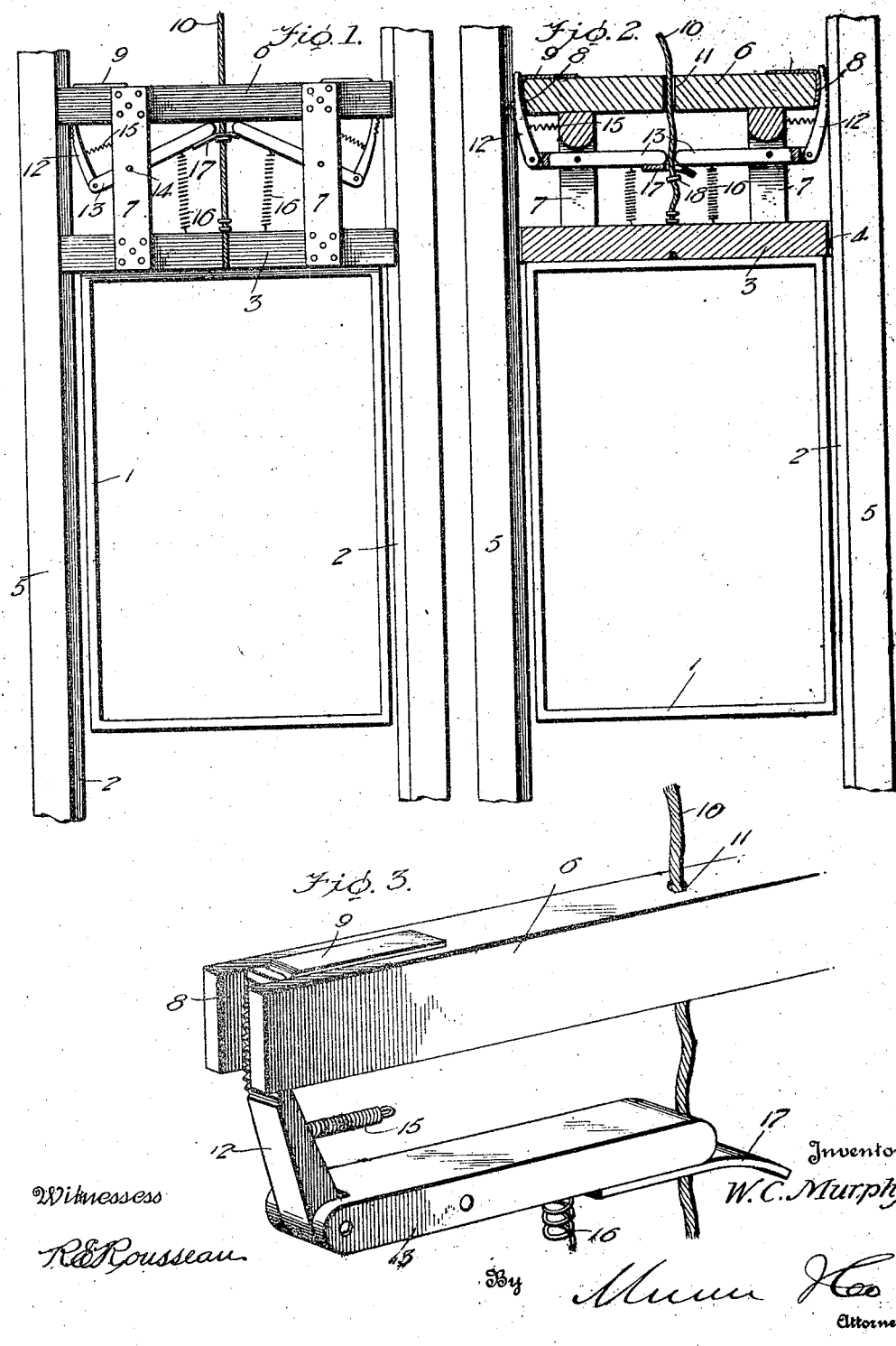

WILLIAM CHRISTOPHER MURPHY, OF RED LODGE, MONTANA.

SAFETY DEVICE FOR ELEVATORS.

1,274,746.	Specification of Letters Patent.	Patented Aug. 6, 1918.

Application filed May 8, 1918. Serial No. 233,343.

*To all whom it may concern:*

Be it known that I, WILLIAM CHRISTOPHER MURPHY, a citizen of the United States, and a resident of Red Lodge, in the county of Carbon and State of Montana, have invented certain new and useful Improvements in Safety Devices for Elevators, of which the following is a specification.

My invention is an improvement in safety devices for elevators, and has for its object to provide a device of the character specified adapted for elevators of every character, mine cages and the like, for preventing downward movement of the elevator or cage in case of breakage of the hoisting cable.

In the drawings:

Figure 1 is a side view of a mine cage provided with the improved device;

Fig. 2 is a vertical section of the cage support, showing the parts in another position;

Fig. 3 is a perspective view of one end of the device.

The present embodiment of the invention is shown in connection with a mine cage 1, which is mounted to move in the shaft between the usual guides 2. A cross bar 3 is connected with the top of the cage at the center thereof, the said cross bar having its ends recessed as indicated at 4 to engage the guides 2 which are supported by the usual beams 5, arranged at opposite sides of the shaft.

A second cross bar 6 is arranged above the cross bar 3 in spaced relation, being held in rigid relation with respect thereto by vertical plates, the said plates connecting the cross bars. The ends of this cross bar 6 are also recessed as indicated at 8 for engaging the guides 2, and at each recess a reinforcing plate 9 is arranged, the said plate covering the end of the cross bar in the recesses and being secured on the upper face of the cross bar as shown.

A hoisting cable 10 is connected with the cross bar 3 in any usual or desired manner, and the said cable passes upward through an opening 11 in the cross bar 6, and said cable is connected with the usual hoisting mechanism for raising and lowering the cage.

A dog 12 is arranged in each recess 8 of the cross bar 6, each dog fitting the recess and having a series of teeth as shown, on its outer face for engaging the guide 2 of the cage. At its lower end each dog is pivoted to the outer end of a lever 13, and each lever is pivoted between a pair of plates 7 as indicated at 14. Coil springs 15 act normally to hold the upper ends of the dogs out of engagement with the guides 2 while other and stronger springs 16 are arranged between the inner ends of the levers 13 and the cross bar 3, the said springs acting normally to draw the inner ends of the levers downward and forcing the dogs upwardly into gripping position as shown in Fig. 2.

It will be understood, referring to Fig. 2 that each dog is essentially wedge shaped, having its small end upward, from which it will be evident that the upward movement of the dogs with respect to the cross bar will cause them to grip the guides 2. On the contrary, when the dogs are in the lowered position in Fig. 1, they do not engage the guides, and there is no danger of blocking or wedging. A plate 17 is secured to the inner end of one of the levers 13, and this plate extends across the space between the adjacent ends of the levers, engaging at its free end the other levers 13. This plate has an opening through which the cable 10 passes, and the cable has a stop 18 for engaging the plate. This plate as shown more particularly in Fig. 3 is curved at its free end, and when the parts are in normal condition and act properly, the stop 18 on the cable will hold the dog out of engagement with the guides, *i. e.*, out of wedging position. Should, however, the cable break the springs 15 will force the inner ends of the levers downward, forcing the dogs upward, and they will wedge between the ends of the cross bar 6 and the guides 2, thus blocking further downward movement of the cage. While the device is shown in connection with a mine cage, it is obvious that it may be used with any class of elevators.

I claim:—

1. In an elevator, the combination with the cage, the guides, and the hoisting cable, of a cross bar arranged above the cage in spaced relation and having an opening through which the cable extends, the ends of the cross bar being recessed to receive the guides, a lever pivoted below the cross bar at each end thereof, a wedge shaped dog pivoted to the outer end of each lever and extending into the adjacent recess of the cross bar, a plate secured to the inner end of one lever and engaging the inner end of the other lever and having an opening through which the cable passes, the cable having a stop for engaging the plate to normally hold the dogs in lowered position, springs arranged between the levers at the inner ends and the cage and normally acting to force the dogs upward, said dogs having teeth on their outer faces for engaging the guides when they are forced upward.

2. In an elevator, the combination with the cage, the guides, and the hoisting cable, of a cross bar arranged above the cage in spaced relation and having an opening through which the cable extends, the ends of the cross bar being recessed to receive the guides, a lever pivoted below the cross bar at each end thereof, a wedge shaped dog pivoted to the outer end of each lever and extending into the adjacent recess of the cross bar, a plate secured to the inner end of one lever and engaging the inner end of the other lever and having an opening through which the cable passes, the cable having a stop for engaging the plate to normally hold the dogs in lowered position, and springs acting normally to force the dogs upward.

3. In an elevator, the combination with the cage, the guides, and the hoisting cable, of a cross bar arranged above the cage in spaced relation and having an opening through which the cable extends, the ends of the cross bar being recessed to receive the guides, a lever pivoted below the cross bar at each end thereof, a wedge shaped dog pivoted to the outer end of each lever and extending into the adjacent recess of the cross bar, a plate secured to the inner end of one lever and engaging the inner end of the other lever and having an opening through which the cable passes, the cable having a stop for engaging the plate to normally hold the dogs in lowered position.

WILLIAM CHRISTOPHER MURPHY.

Witnesses:
  JOSEPH MURPHY,
  WILLIAM E. POWELL.